Patented Sept. 11, 1934

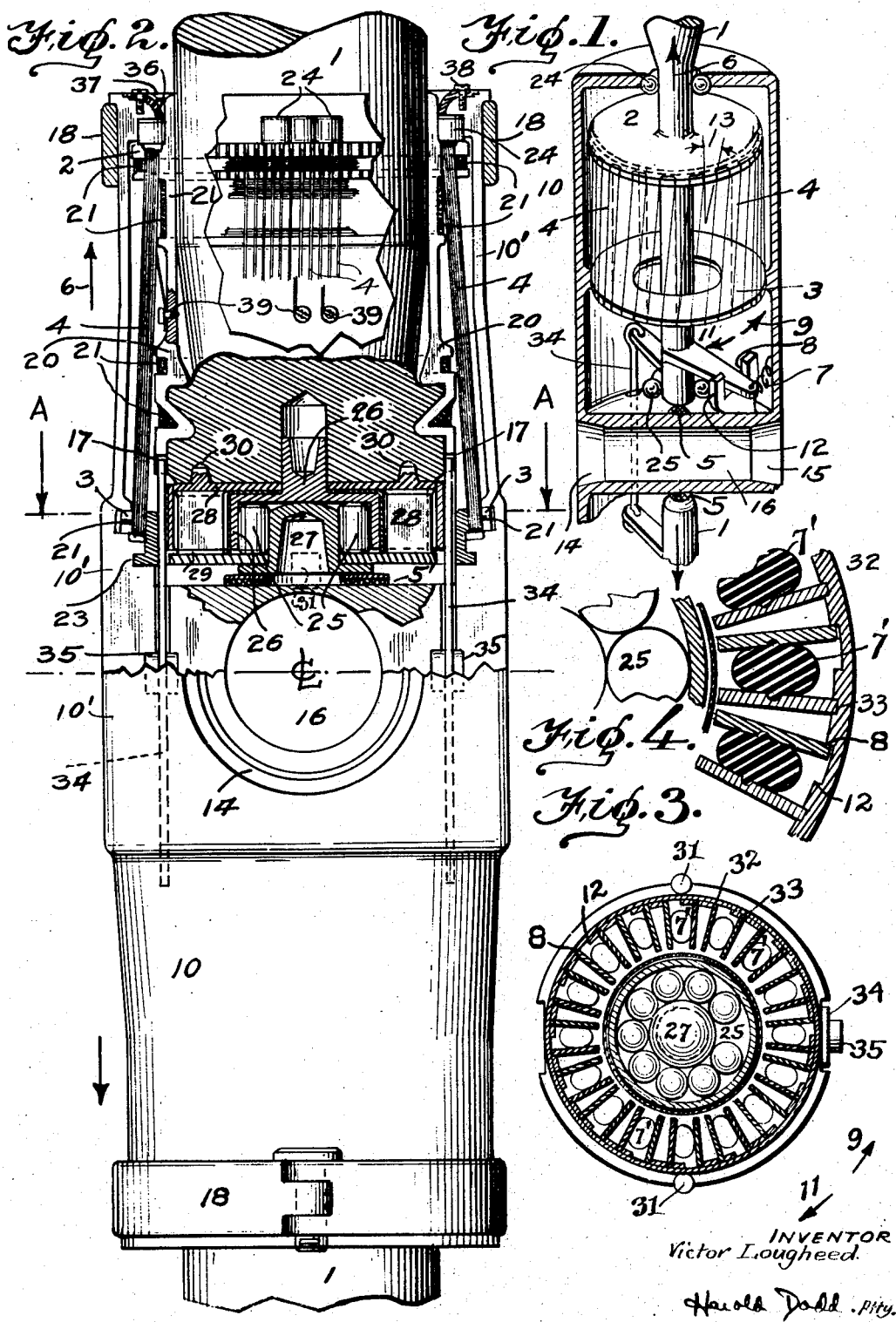

1,973,573

UNITED STATES PATENT OFFICE 1,973,573

SCREW PROPELLER

Victor Lougheed, Washington, D. C.

Application July 1, 1929, Serial No. 375,024

17 Claims. (Cl. 170—162)

My invention relates broadly to screw propellers, but more particularly relates to an automatic screw propeller for aviation use, which embodies features that allow the pitch to be varied not only by automatic means, but also by manual means. A primary object of my invention thus is a simple and ruggedly-constructed propeller, the blades of which, at some given critical speed of rotation, reliably, positively and automatically shift from a predetermined angle of setting, or pitch, to a different predetermined angle of setting, or pitch, solely by the effect of a change in the rotational speed, without the complication of a manual actuating mechanism, and wholly without any attention from the pilot.

Secondary objects are to provide an angularly variable bearing for aeroplane-propeller-blades, in their hub, adequate in load capacity or strength to withstand the very high centrifugal forces involved by the weight of conventional blades, at accustomed speeds of rotation, and at the same time possessed of a low enough coefficient of friction to allow the angular movement of the blade to be effected without excessive effort, whether such effort be provided with or without the aid of a servo or other actuating mechanism.

Another object is so to construct a propeller that changes in the centrifugal force, acting upon the mass of its blades and varying with the square of the blade velocity, can be utilized to change the blade angle, from one to another of two desired settings, or through a range of settings.

Other and incidental objects of my invention will appear more fully as its description hereinafter is followed.

The primary problem in variable-pitch and reversible-blade propeller design is consequent upon the extreme magnitude of the centrifugal forces acting to pull the blades out of the hub.

Centrifugal force, which with an air propeller turning at 1800 revolutions a minute, for example, and with a blade weight of 20 pounds regarded as being located at a radius of 3 feet from the center of rotation, reaches a value of over 33 tons, is so great that even with the most-efficient ball and roller bearings the sizes and weights of such bearings adequate to carry the load are prohibitive. Moreover, the energy requisite to produce angular rotation of the blades, mounted even in the best of such anti-friction bearings, with the propeller turning at full speed is found to be much greater than any effort it is reasonably possible to exert by hand, or through any remote-control servo mechanism except such as have been found too massive or complicated to be practical.

This force, so enormous in contrast even to the maximum weights and proportions allowable in the parts of an aviation propeller, heretofore has defeated every attempt to provide bearings really adequate to carry it, and yet light enough in weight and of sufficiently low friction coefficient to permit angular blade movement, and without unreasonable physical effort.

There are also serious secondary problems— of providing free blade movability without introducing such looseness or lost motion as must permit vibration and thus occasion failure of the structural elements, the materials of which in established propeller practice are stressed uncomfortably close to their limits of strength; and, generally, of building the hub and mounting the movable blades in such a manner that the structure cannot fly to pieces.

My invention consists substantially in the construction, combination and arrangement of parts associated in my improved propeller as will be more fully hereinafter set forth as shown by the accompanying drawing and finally pointed out in the appended claims.

Reference is to be had to the accompanying drawing forming a part of this specification in which like reference characters indicate corresponding parts throughout the several views and in which:

Figure 1 is a diagrammatic illustration of the principles upon which my invention is founded.

Figure 2 is a detail view, in partial section, of a two-bladed propeller embodying my invention, and drawn to scale, as designed for a Wasp aircooled engine.

Figure 3 is a detail view of radial or torsional spring and stop elements, and an axially-acting spring cushion, as applied, and referred, to each blade in Figure 2.

Figure 4 is an enlarged view of a portion of Figure 3.

Referring particularly to Figure 1, numeral 1 designates a propeller blade rigidly attached to the upper blade-flange element 2, which is connected to the lower hub-flange element 3 through the system 4—4 of fine strong wires in tension. This tension is produced, when the propeller is at rest, by the spring or elastic cushion 5 acting in the direction of the arrow 6. The wires 4 are of great strength and inherently-pliant so that the same are freely flexible in torsion. By the use of "inherently-pliant" wires I desire it to be understood that the wires 4 have the property of being easily bent or twisted without snapping or breaking so that the said wires 4 will be pliable or flexible when the blade 1 is rotated in the hub 10. At the same time, the spring 7, by rotating the blade 1 and the flange element 2 against the stop 8, in the direction of the arrow 9, draws the flange element 2 slightly closer to the flange element 3 than would be the case with the wires 4—4 parallel to the axis of the blade 1. Consequently as shown by the dotted structure, when the whole propeller is rotated on its hub 10, by the centrifugal force thus developed, this centrifugal force, added to the pressure exerted by the spring 5, and acting in the same direction 6, produces a restoring couple, tending to draw the flange 2 into the dotted position, further away from the flange 3, to parallel the wires 4—4 into their dotted position and to rotate the blade 1 and the flange element 2 in the direction of the arrow 11, away from the stop 8, and against the stop 12 and against the pressure of the spring 7.

By suitable design, placement of the stops 8 and 12, proportioning of the angle 13, and tensioning of the springs 5 and 7—in relation to the centrifugal force of the blade mass at given velocities, it is evident that the blade angles of a propeller can be made to change from any given pitch to another given pitch, at a given speed of rotation—one of the two pitches thus selected being that of the blades at all speeds below the critical speed, and the other applying to all speeds above this critical speed.

For example, to meet the conditions of operating military patrol and bombing aeroplanes, and of most commercial aeroplane operation, it would be of great advantage for starting from difficult fields or from the water, and for climbing, to have the propeller pitch low and the engine speed high, while for level cruising the pitch should be high, to maintain proper airspeed with the engine speed low, to favor the engine. Consequently, to meet this condition, my propeller can be built, for example, with a normal high pitch angle of, say, nineteen degrees, which holds constant up, say, to 1600 R. P. M. of the engine. Exceeding this speed therefore, on the ground before takeoff, can be made to flatten the pitch to, say, sixteen degrees, allowing the engine to apply to takeoff and climb maximum power through the propeller angle most effective to produce high thrust, by running perhaps, at 2000 R. P. M. or higher. Once leveled off in the air, however, throttling the engine revolutions below 1600 R. P. M., and keeping them below this figure, allows the pitch to increase, the thrust to drop from its highest effective value to the lower thrust for efficient level flight, and the engine to idle at a low R. P. M. with less than its maximum power output and fuel consumption.

To meet the operating conditions of military combat aeroplanes, on the other hand, the nineteen degrees setting for cruising might be allowed to prevail up to 2000 R. P. M., above which a still higher angle of twenty degrees, say, might be brought into effect by a still higher engine speed, of possibly 2200 R. P. M. or more. In this case, starting or takeoff is disregarded, because the machine is of a fast, light, overpowered type, with so much power that the take-off problem is relatively simple, as compared with the slower, heavier, less powerful machine, with which a top speed slightly higher than cruising speed is unimportant, and takeoff a serious matter, and in this case it is obvious that the angle 13, of the wire system 4—4, must be the reverse angle from that employed in the preceding case, for a given direction of engine rotation.

It is to be recognized that the torsional forces on the blades, of a propeller of my invention, may be more complex than a mere matter of the spring thrust as shown by arrow 9 opposing the torque produced by the axial thrust 6. For there also may be unbalanced aerodynamic torque on the blade, and increments of unbalanced blade torque due to centrifugal forces in the blade acting at various angles to its axis, with varying resultants. But these all can be provided for and met in the design, so their consideration is an incidental rather than a fundamental one, to my invention.

The embodiment of my invention shown in Figure 2 therefore is by no means the only possible embodiment, but is merely one that I prefer at this time because it most completely eliminates problems of blade flutter which may be involved, and the added complication of any structure.

Referring now to Figure 2, in this drawing only the shanks of the blades 1—1 are shown, without the complete blades, as the latter may be of any suitable form or construction, and may vary in design for any specific use, and, in any case, are only an incidental, though of course necessary, part of my invention. In Figure 2, the hub 10 follows closely the general design of present standardized American military and commercial propeller practice, the two halves, 10 and 10', being parted as shown, parallel to the propeller blade axis and at right angles to the engine crankshaft axis. The hole through the hub fits at 14, 15, and 16, Figure 1, the standard taper collars and splined crankshaft, to take the driving effort and prevent looseness. These two halves of the hub are held together by the standard scheme of two bolts, not shown, and two clamps, 18—18.

To the blade 1 is applied the split ferrule 20, engaging with the steps on the blade root, and tightly secured in place by the piano-wire wrappings, 21, 21, 21, 21, 21, or by suitable clamps, or by other means. The flange 2, on this split ferrule is notched at close intervals like an armature, allowing the ribbon of fine wires 4—4 to be wound back and forth between it and the similar notches in the flange 3, which is locked in the split hub by the clamping of the latter upon it. The centrifugal load of the blade, thus taken by the wires 4—4, is transmitted to the blade root through the compression strength of the ferrule 20, and is taken in the hub, in its heavy bottom sections near the crankshaft, so that the extended sleeve-like portions of the hub carry no load but the relatively moderate radial load due to the propeller thrust and driving torque, which is borne on the system of bearing rollers 24, interposed between the ferrule 20 and the hub 10.

The whole system of taking the thrust load due to centrifugal force thus is such as to avoid both the rolling friction of ball and roller bearings, and the sliding friction of plain bearings, both of which become excessively high in all applications that have been made to this propeller problem, because, in the cases of balls and rollers, the loads must be such as to flatten them unduly and to pit the raceways, while in the cases of plain bearings the high loadings squeeze out the lubricant and occasion excessive wear.

As contrasted to these conditions, my invention provides a means for applying to the practical solution of this problem the merits of filiform bearings, heretofore limited chiefly to scale and balance structures, and in which the small weight and the exceedingly low friction coefficients, in proportion to given load capacities, involved in bending very slender tension elements, which can be readily made of materials of the highest weight-strength ratios known—steel wire or ribbon, for example—are advantages of the greatest value for application to variable-pitch propeller design.

As a practical means of holding the ends of the wires 4—4, these ends are clamped under the screws 39—39.

The necessary additional radial location of the blade 1, at its inner extremity, is secured by the roller bearing 25, acting between a cuplike outer raceway 26 borne in the blade root, and a stud-like inner raceway 27 located by the hub, as shown.

Also interposed between the blade root and the hub are the upper spring plate 28 and the lower spring plate 29. Of these, 28 is keyed to the blade root 1 by the studs 30—30, and 29 is keyed to the hub by the dowel keys, 31. These dowels 31 also key to the hub 10 the lower flange element 3.

Referring now to Figures 3 and 4, which are cross sections through 28 and 29, Figure 2, as assembled, it is to be noted that these two spring plates are each provided on their facing surfaces with a group of plural radial flanges 32, 33, which alternately intermesh with each other, and between each pair of which is interposed an elastic rubber cushion or pad 7'—7', provided to rotate the blade on its axis in the hub in the direction 9, as by the spring 7 of Figure 1. Such rotation is limited in amount by the stop ring 8—12 which, slid over the flanges 32, 33, as shown, bears on its inner surface a system of alternately wide and narrow slots, the narrow slots closely engaging the flanges 33, and the wide slots loosely embracing the flanges 32, so that the angular movement allowed the latter, and with them the plate 28 and the blade 1, is limited as by the stops 8 and 12 of Figure 1. Evidently, by the substitution of various ones of a series of variously slotted stop rings of the general type shown, the angular movement can be set or controlled within considerable limits.

The actual blade angle, from the plane of propeller rotation, is determined by the angular position within the split ferrule 20 to which the blade may be clamped.

The ringlike pad or cushion 5', of elastic rubber, is the equivalent of the spring pad 5 of Figure 1, and serves to push the blade outward, principally for the purpose of eliminating rattle or lost motion with the propeller idling, and to facilitate assembling of the different elements in their proper relationships.

Against any tendency that might develop, with the spring elements 7' at the base of one blade to compress more easily than those of the other blade, or in the way of unequal centrifugal force in the different blades of a propeller, to cause the angular movement of one blade to precede or lag behind the similar movement of the other blade, the several blades are tied together by pairs of equalizing links 34, working in slots milled in the hub halves, pivoted on the pins 35, and at their ends engaging with notches provided for this use in the lower edge of the ferrule 20, as at 17.

To allow retention of grease within the space between the propeller shank 1 and the hub 10, for the purpose of lubricating the roller bearings 24 and 25, and to protect against rust the wire system 4—4, and other elements, the curved cup-leather 36 closes the space between hub and blade ferrule, being held in place by the retaining flange 37, which is secured to the hub by the screws 38. The curved cross section of this cup-leather 36, when it is subjected to the centrifugal force of its mass and of the grease against and retained by it, causes it to hug the ferrule 20 and prevent leakage more effectively in the same proportion as increase in centrifugal pressure tends to cause leakage.

While my invention is schematically illustrated in Figure 1, in proportions and with details other than those of a practical design, and in Figures 2, 3, and 4 is disclosed with details as designed for a specific purpose and application, it is not to be understood that these illustrated embodiments of my invention exclude other embodiments of my invention, arranged with different aggregate elements combined into the same essential structure and to produce similar results, or assembled of parts and details of wholly different proportions, but still embodying my bearing structure, constituted of small, relatively very flexible wires or bands, for resisting the centrifugal force while at the same time allowing very free angular rotation, without appreciable or serious frictional resistance to demand large effort to produce such rotation.

While the particular embodiment of my invention shown in the drawing herewith is of a two-bladed propeller, my invention is equally applicable to multibladed constructions.

Other modifications and combinations are obvious, and would occur to any engineer or mechanic, familiar with the field to which my invention applies, and to whom its details were disclosed.

It will be understood that the above description and the accompanying drawing comprehend only the general and preferred embodiment of my invention, and that various changes in construction, proportion and arrangement of parts may be made within the scope of the appended claims, and without sacrificing any of the advantages of my invention.

I therefore do not limit myself to the exact details, as illustrated, but, having thus described my invention, I claim:

1. A variable-pitch propeller comprising a hub having bearing surfaces on its inner periphery adjacent its ends, a blade having a flange bearing shank, said hub bearing surface adapted to receive the thrust of said shank means annularly locating the blade in said hub, means angularly locating the blade, flexible tension elements opposing said last means and means adapted to actuate said axial locating means.

2. An automatic variable-pitch propeller comprising a hub having an inwardly extending flange, a blade, a shank carried thereby, a flange mounted on said shank and adapted to bear against said hub flange, means annularly locating the blade in the hub, spring pressure means angularly locating the blade, flexible tension elements opposing said spring pressure means and means adapted to be actuated by said angular locating means to rotate the propeller.

3. An automatic variable-pitch propeller comprising a hub, blades, and means in said hub retaining said blades therein, said means consisting of spring pressure means axially locating the blades and flexible tension elements opposing said spring pressure means whereby at a predetermined critical operative speed, centrifugal force shifts the angle of blade pitch from one magnitude to another.

4. In a variable-pitch propeller, a hub, blades blade thrust bearings consisting of inherently-pliant tension elements, disposed between the hub and blades in substantial parallelism with the blade axes, and actuating means in said hub whereby the centrifugal force thrusting against said bearings opposes only a feeble resistance to angular rotation of the blades by said actuating means through a moderate range, insufficient to move the tension elements to more than relatively small helical angles with the blade axes.

5. In an automatic variable-pitch propeller, a hub, blades, thrust bearings consisting of relatively slender, inherently-pliant tension elements disposed between the hub and blades, means in said hub adapted to hold said tension elements at helical angles to the blade axes, and stops on the hub for limiting the movement of the blades whereby the centrifugal force acting within the blades produces a restoring component tending to draw the tension elements into parallelism with the blade thus causing, when of sufficient magnitude, angular rotation of the blades between the stops.

6. In an automatic variable-pitch propeller, a hub, blades having the shanks thereof inserted in said hub, tension means disposed between the hub and blades for retaining said blade shanks in the hub, means secured to said blade shanks having spring elements for holding said tension means at helical angles to the blades and stops on the hub for limiting the said spring elements whereby centrifugal force acting within the blades produces a restoring component tending to draw said tension means into parallelism with the blade axes, thus causing, as it rises above or falls below some critical magnitude, angular rotation of the blades back and forth between said stops.

7. In an automatic variable-pitch propeller, a hub, blades having the shanks thereof inserted in said hub, flexible wires strung from the hub to said blade shanks to retain the blades in said hub, spring plates secured to said blades, corresponding spring plates secured to the hub and spring members inserted between the hub spring plates and the blade spring plates to hold said wires at a helical angle to the blade axes, and limiting stops on said hub spring plates whereby centrifugal force acting within the blades produces a restoring component tending to draw said wires into parallelism with the blade axes thus causing angular rotation of the blade within the limits of said stops.

8. In a multiblade variable-pitch propeller, a hub having blades extending therefrom, tension elements retaining the blades in said hub, means in said hub for automatically varying the angle of pitch of said blades by centrifugal force and equalizing links connecting all the blades in said hub thereby maintaining similar angular movement and angular setting of each of the several blades.

9. In a multiblade variable-pitch propeller, a hub, blades inserted in said hub, tension elements retaining said blades in the hub, means for angularly rotating said blades by means of said tension elements and means for simultaneously equalizing the rotation of all the blades.

10. In a multiblade variable-pitch propeller, a hub, blades inserted in said hub, tension elements retaining said blades in the hub, means for angularly rotating said blades by means of said tension elements, and equalizing links connecting all the blades in said hub thereby maintaining similar angular movement and angular setting of each of the several blades.

11. In an automatic variable-pitch propeller, a hub, blades having the shanks thereof inserted in said hub, flexible wires strung from the hub to said blade shanks to retain the blades in said hub, spring plates secured to said blades, corresponding spring plates secured to the hub and spring members inserted between the hub spring plates and the blade spring plates to hold said wires at a helical angle to the blade axes, and limiting stops on said hub spring plates whereby centrifugal force acting within the blades produces a restoring component tending to draw said wires into parallelism with the blade axes thus causing angular rotation of the blade within the limits of said stops, and equalizing links connecting the blades in said hub so that the rotation and setting of the blades is simultaneous and equal.

12. A variable-pitch propeller comprising a hub having a bearing surface around its inner and upper periphery, a blade having a flange bearing shank, said hub bearing surface adapted to receive the thrust of said shank, means annularly locating the blade in said hub, means axially locating the blade, flexible tension elements opposing said last means and means adapted to actuate said axial locating means.

13. An automatic variable-pitch propeller comprising a hub having an inwardly extending flange, a blade, a shank carried thereby, a flange mounted on said shank and adapted to bear against said hub flange, means annularly locating the blade in the hub, spring pressure means axially locating the blade, flexible tension elements opposing said spring pressure means and means adapted to actuate said axial locating means.

14. A variable-pitch propeller comprising a hub, a blade, tension elements retaining said blade in the hub against centrifugal thrust, means axially locating said blade, means adapted to actuate said axial locating means, and means angularly locating the blade in the hub.

15. A variable-pitch propeller comprising a hub, blades, means comprising in part tension elements retaining said blades in the hub, means locating said blades axially and angularly in the hub and means adapted to actuate with the aid of said tension elements said axial and said angularly locating means.

16. A variable-pitch propeller comprising a hub, blades, means having a plurality of tension elements retaining said blades in the hub, means angularly locating said blades in the hub and pad means axially locating the blades in the hub.

17. A variable-pitch propeller comprising a hub, a blade, means having a plurality of tension elements retaining said blade in the hub, means angularly locating said blades, means adapted to actuate with the aid of said tension elements said angular locating means and pad means axially locating the blade in the hub.

VICTOR LOUGHEED.